United States Patent
Palyi

[11] 3,821,451
[45] June 28, 1974

[54] DEHULLING RAPE SEED

[76] Inventor: Leslie Palyi, 23 Larahee Crescent, Don Mills, Ontario, Canada

[22] Filed: Oct. 13, 1971

[21] Appl. No.: 188,797

[30] Foreign Application Priority Data
July 14, 1971  Germany.......................... 2135173

[52] U.S. Cl................. 426/483, 426/520, 426/524
[51] Int. Cl................................................ A23l 9/00
[58] Field of Search...... 99/233.3, 233.8, 469, 483, 99/488, 493, 612, 626, 640, 470, 233.2, 233.4, 233.6, 483, 469, 600, 612; 426/478, 479, 482, 481, 483, 484, 470; 165/61, 65

[56] References Cited
UNITED STATES PATENTS

| | | | |
|---|---|---|---|
| 106,627 | 8/1870 | Skelly | 99/233.3 |
| 263,913 | 9/1882 | Kellogg | 99/626 X |
| 385,870 | 7/1888 | Melkersman | 99/233.8 X |
| 411,316 | 9/1889 | Ager | 99/233.3 X |
| 431,785 | 7/1890 | Short | 99/626 X |
| 522,996 | 7/1894 | Mead | 99/488 |
| 810,960 | 1/1906 | Miller | 99/612 X |
| 1,042,929 | 10/1912 | Lanaux | 99/626 X |
| 1,317,342 | 9/1919 | Williams | 99/640 X |
| 1,995,693 | 3/1935 | Urschel | 99/640 X |
| 2,139,180 | 12/1938 | Urschel | 99/640 X |
| 2,389,113 | 11/1945 | Reichel | 99/493 X |
| 2,974,668 | 3/1961 | Witzel | 99/626 X |
| 3,054,433 | 9/1962 | Lucidi | 99/233.8 X |
| 3,104,691 | 9/1963 | Minera | 99/640 |
| 3,132,681 | 5/1964 | Keen | 99/233.3 |
| 3,179,140 | 4/1965 | Satake | 99/488 |

Primary Examiner—Norman Yudkoff
Assistant Examiner—Martin G. Mullen
Attorney, Agent, or Firm—Ostrolenk, Faber, Gerb and Soffen

[57] ABSTRACT

Rape seed is dehulled without oil being extracted from the kernels thereof by a method comprising heating the rape seed to about 45°C, cooling it with a current of cold air which carries it to impact against a surface to crack the hulls thereof and separating the hulls therefrom by moving said current past friction applying means.

6 Claims, 5 Drawing Figures

DEHULLING RAPE SEED

Rape seed has a very high oil content of approximately 40 percent by weight, a protein content of 32 to 35 percent and a fiber content, that is to say cellulose content, of 15 percent by weight.

Up till now rape seed has been prepared by firstly crushing it and then expressing the oil from it. The oil is then collected. The remaining rape cake has been used as cattle feed, the high cellulose content being only suitable for cattle and not for smaller farm animals. The rape oil with a high rutinic acid content is used as a vegetable lubricant, for example for transmission. If the rutinic acid content is low, the oil can also be used for human food as in the production of margarine and vegetable cooking oils.

To date it has not been possible to dehull the rape seed as has long been possible in the case of other grains. In the case of rape seed it has not been possible to remove the hull because on breaking open the grain owing to the heat produced the oil surrounds the hull, which can then not be separated from the oil.

One aim of the invention is therefore that of dehulling rape seed and in accordance with the invention and this aim is attained in that the rape seed is heated to approximately 45°C so that the grain diameter is increased, the rape seed is then passed by means of a cold air current to an impact plate arrangement, so that the hulls are cracked and the rape seed broken open in this manner is then separated mechanically by friction without oil extraction from the hull. The hull and the grain are separated in an air current classifying device. With this method there is the advantage that the protein content of the product obtained, that is to say the rape cake, increases and the cellulose content is reduced. With the invention it is possible to reduce the cellulose content down to 4 to 7 percent as opposed to 15 percent as was previously the case, that is to say the cellulose content is reduced by a half or a third, so that the product becomes accessible as feed for non-ruminant farm animals. The protein content increases from 34 to 48 percent. All percentages are given by weight.

The remaining hulls can be spread on pasture and arable land as a manure owing to the high nitrogen content; this waste product is also useful for manuring mushrooms.

In accordance with a preferred form of the invention the treatment of the rape seed is carried out as follows:

Any iron particles are removed in a magnetic separator. Following this the rape seed is treated mechanically to remove any other foreign bodies and is then passed to a weighing station and finally to a heating station. In the latter the rape seed is heated to approximately 45°C (even at a temperature as low as 60°C oil would start to emerge). The rape seed is then passed via a hopper into a metering device and from thence into a mixing chamber in which it is mixed with a cold air current and is then conveyed towards a battery with impact plates where an impact treatment is carried out and the hulls are broken open, that is to say provided with cracks. This procedure can be carried out in several stations arranged in tandem. Following this the rape seed passes into further batteries in which the hull is removed, the rape seed being conveyed along helical passages in which mechanical action brings about the removal of the hull. This part of the apparatus or battery can also be in the form of several units arranged in tandem, the outer wall being formed by a helical line and the inner by a fixed central body, which on the exterior casing carries a helical line of opposite hand. Owing to this the hull is removed from the kernel without the oil being able to emerge. The central part of the batteries is arranged to taper slightly in a conical fashion in the direction of movement of the rape seed. Owing to the decrease in the cross-sectional area in the direction in which it is conveyed the seed is subjected to an improved dehulling action. The parts of the batteries or units coming into contact with the rape seed can be coated with abrasive material in order to improve the mechanical action. Instead of this it is also possible to provide a sawtooth-like casing construction.

Following this the mixture passes into a header or collector and then into an air current classifying device in which the separation of the hulls from the kernels or grains is brought about by gravity separation, preferably in a two-stage process. At the outlet of the air current classifying device a final product is obtained, that is to say the oil-containing and protein-containing kernel material amounting to about 76 percent by weight of the input. The result is a coarse grain. The separated hulls are supplied to a further air current classifying device and separated from still adhering fine grain kernel or grain components. The small grain particles are supplied to a separator in which rollers provided with polyamide casing rotate. Owing to the static attraction the hulls adhere to the surface of the polyamide rollers and are removed, while the end product drops under its own weight downwards. The removal of the hulls is carried out by means of rotating brushes. In this manner a second class final product is obtained amounting to 12 percent of the input. This part of the end product is fed to be of second quality because it contains more cellulose, that is to say 8 to 9 percent.

When the oil is expressed from the rape seed dehulled in accordance with the invention a rape cake is obtained with a protein content between 50 and 60 percent and a cellulose content of approximately 4 percent. The results, which have been obtained by laboratory tests, show the advantage of the dehulling method. The hulls themselves can be strewn as manure or used of a filtering material for industry, the nitrogen content providing for a natural filtering action.

In accordance with the diameter of the rape grains the proportion by weight of the hull amounts to 12 to 16 percent and it was previously found to be impossible to undertake such a dehulling operation because the size of the grains was so widely scattered and because furthermore the kernel is very soft in comparison with the hull. The kernel has such a high oil content and even slight heating leads to escape of oil, something which again tends to stand in the way of an effective dehulling operation.

In what follows the method in accordance with the invention will be explained with reference to the accompanying drawings, which show an apparatus in accordance with the invention for carrying on the method.

The rape seed is passed via a magnetic separator MA, which removes any metallic components, to the inlet 10 of a separator AS, in which any other foreign bodies and impurities are removed. From the output 12 of the separator the rape seed cleaned in this manner is passed to a weighing device W and from this latter to a heating device in which the rape seed is heated to a temperature of approximately 45°C (110°F). The heating device is of the radiant type and the rape seed remains at this raised temperature for 2 to 3 seconds. During this short heating action the diameter of the rape grains increases by about 2 to 3 microns. The heated rape seed is removed from the heating device via a hopper T and a metering device D and is passed to a mixing chamber MK, which is heated at a maximum temperature of approximately 10°C (50°F) and has a maximum moisture content of 45 percent. In this mixing chamber MK the heated rape seed is constantly brought into contact with a cold air current, which is supplied by a blower V. The consequence of this is a shrinkage of the grains or kernels, this constituting a physical requirement for the separation of the hull from the kernel. The hull keeps the same shape that it had before the heat treatment.

By means of an air current speed of 1,300 to 1,700 meter/min the rape seed carried in the air is led to the dehulling machine proper, which is made up to tandem connected batteries A, B and C. In accordance with the embodiment shown three batteries of each type are provided. It is, however, possible to use less batteries or in particular cases to arrange still more batteries of each type in tandem. The batteries A have funnel-shaped tandem arranged impact plates 14, the angle of impact being so selected that only a relatively weak impact load occurs, which only results in the breaking open of the hull and prepares the hull for the actual dehulling operation.

Figure 3:
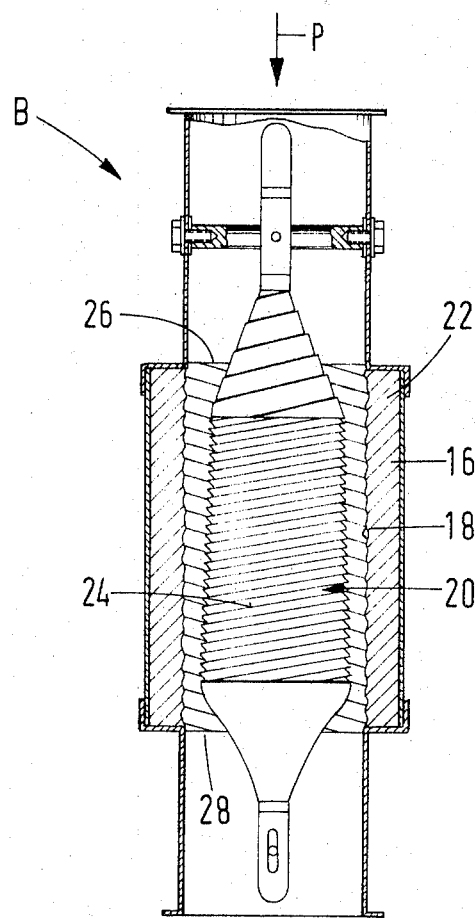
FIG. 3 shows, on a scale larger than that of FIG. 1A, a sectional view of batteries or units denoted by reference letter B in FIG. 1A.
Figure 4:
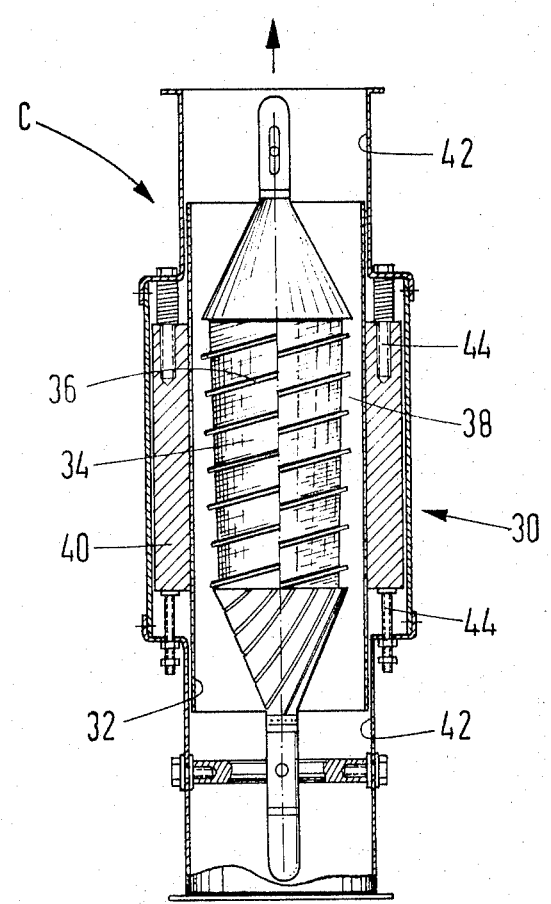
FIG. 4 shows, on a scale larger than that of FIG. 1B, a sectional view of a battery C.

The rape seed with the hulls broken open in this manner is passed in the air current to the batteries B, of which one is shown in detail in FIG. 3. These batteries B are so constructed that the rape seed is caused to carry out a spiral or helical movement and owing to contact with the channel wall dehulling occurs. The batteries B consist of a cylindrical housing 16 with an inner wall 18 which has a helically running groove. At a spacing from this wall there is a core 20 which becomes wider in the direction of passage (arrow P) and the outer casing of this core 20, also provided with a helical groove, is arranged in the housing so as to leave a passage chamber 22. The thread 24 formed by the helical groove on the core 20 has a sawtooth cross-section as can be seen from FIG. 3. Owing to the conical construction of the core 20 the passage cross-section of the chamber 22 decreases from the inlet end 26 towards the outlet end 28. On passing through the chambers 22 in the form of a helical whirl the hull is removed from the kernel without any oil being able to escape.

As can be seen in the case of the batteries B the helical lines on the outer casing and the core casing are of the same hand. Instead of the threaded casing 24 the core can also be provided with a casing of abrasive material, for example in the form of carborundum or the like.

In the following batteries C the rape seed is again subjected to the action of a helical vortex or whirl action, though in the opposite direction as was the case with the batteries B. These batteries C consist of a housing 30 with a comparatively smooth outer casing 32 and a conical core 34 with a diameter increasing in the direction of passage. The core 34 has a helical strip 36. The annular passage chamber 38 again tapers in the passage direction in cross-section though, however, the passage cross-section is lower than that of the arrangement of the batteries B in order to achieve dehulling in stages. The tube 32 limiting the outer wall of the annular chamber 38 tapers in the passage direction and this tube is carried by a cleat and can slide upwards and downwards in relation to the housing wall. The tube cleat 40 is carried by screws 44 in the housing and can be adjusted in the axial direction, so that the cross-section of the annular chamber can be adjusted.

Figure 1A:
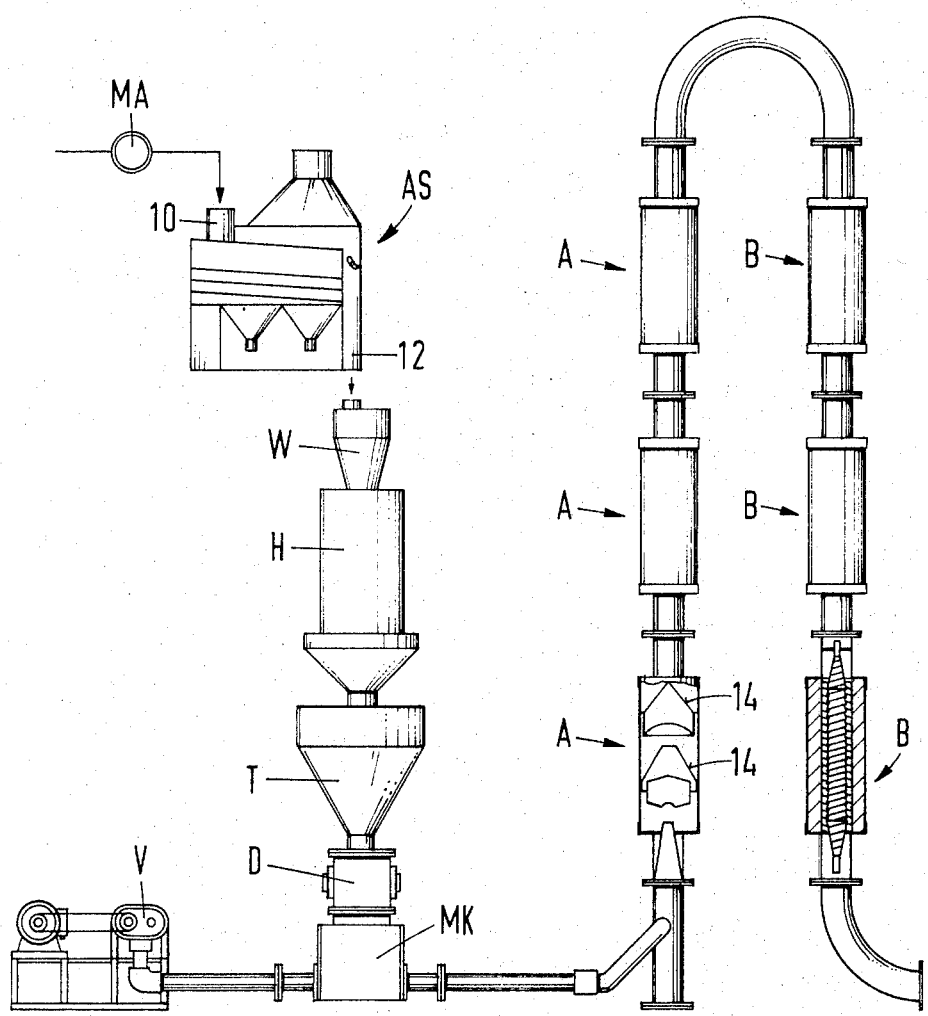
FIGS. 1A and 1B are a diagrammatic view of the continuously operating installation for dehulling rape seed.
Figure 1B:
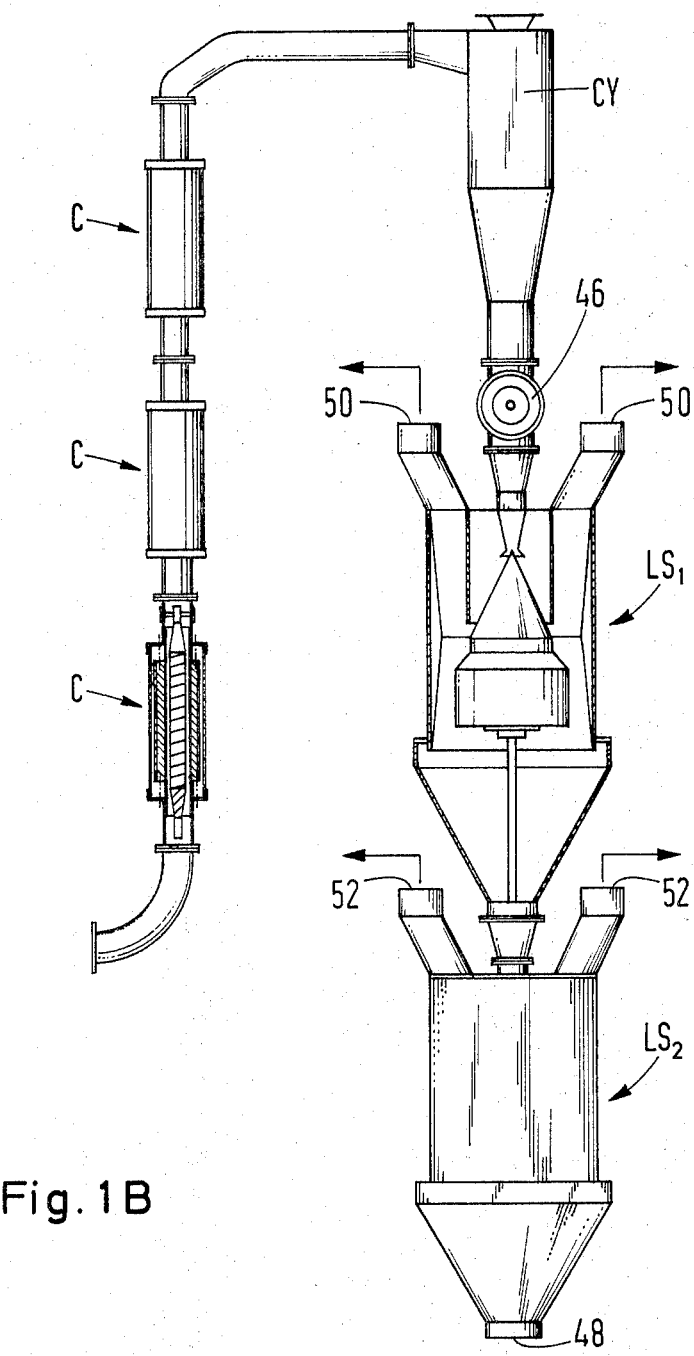
Figure 2:
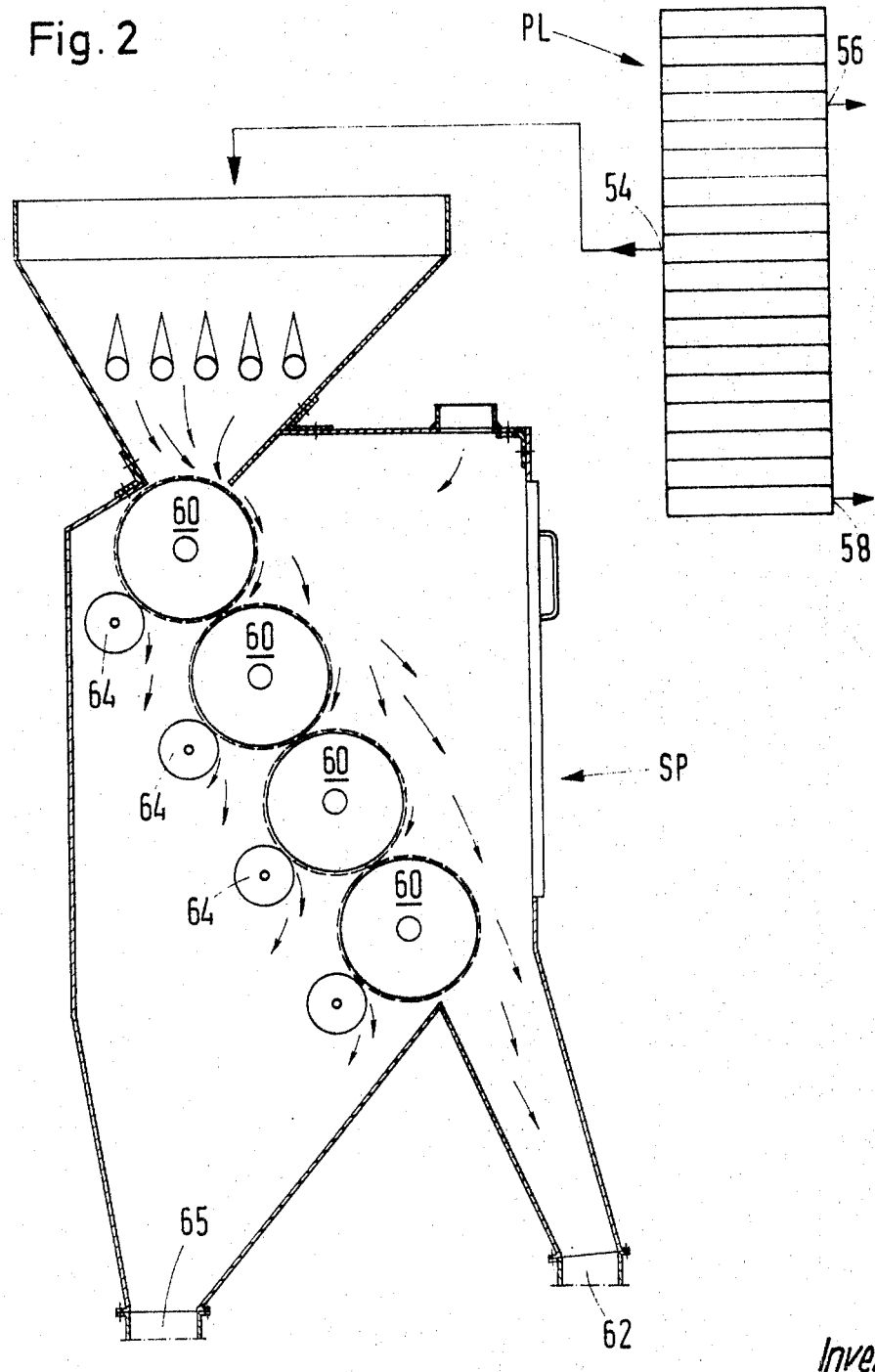
FIG. 2 shows an air current classifying device arranged to be fed by the installation shown in FIGS. 1A and 1B.

From the last battery C the rape seed with the hulls which have been removed passes into a spiral cyclone Cy which is constructed with double walls because the hulls cause considerable wear owing to their spiral movements, so that the wall must be capable of being easily replaced. Via an air lock 46 the dehulled grains or kernels pass from the cyclone, together with the hulls, into an air current classifier $LS_1$ and then pass into a further air current classifier $LS_2$. The hulls and the kernels are separated by gravity separation in these devices and at the output 48 of the second air classifying device $LS_2$ coarse grain rape of a first quality is obtained so as to amount to about 76 percent by weight of the input feed. The air classifying device operates in accordance with the counter-current principle and the guidance of the air can be adjusted in order to obtain a favourable separating action. The reason for the use of two air classifying devices is that 24 percent by weight of hulls without any admixture are removed from the first air classifying device $LS_1$ at 50 and these hulls can be directly used without any further treatment, while the remainder must be supplied to the second air classifying device. From the output 52 of the latter hulls are drawn off which contain small amounts of core or kernel and the mixture must therefore be subjected to further separation, this being carried out in a screen sifter PL (FIG. 2). The proportion of hull material amounts to 16 percent of the rape seed, which was supplied under pressure to the batteries. At the output 54 of the screen sifter PL the utilisable output material, that is to say the fine grained parts are drawn off and supplied with a separator SP. The hulls are drawn off at 56 and the dehulled rape seed is drawn off at the output 58, from whence it can be passed to oil presses. In the separator SP several rollers 60 are journalled in tandem, whose casing is provided with a plastics material layer, for example of polyamide so as to make possible a high static charging. Owing to this charge the hull residues are attracted, while the flour is passed on and can be drawn off at the output 62. The hulls are brushed off the roller casings by rotating brushes 64 and supplied to the output 65, from whence a second class final product is obtained, its quantity amounting to 12 percent by weight. This end product is said to be of second class quality because it contains more cellulose than the product at the output of the air classifier LS$_2$, that is to say it contains 8 to 9 percent.

The effectiveness of the method in accordance with the invention is due to the fact that the dehulling action takes place in connection with compressed air and no moving parts are necessary, which might produce a heating effect during the treatment. Accordingly the rape seed is only damaged to a slight extent. An advantage of this is that the costs for servicing the system are very low and the system is furthermore extremely adaptable.

The apparatus in accordance with the invention is not only suitable for dehulling rape seed but can also be used for the following grains for the same type of dehulling: wheat (soft or hard), barley (six-rowed and two-rowed), feed barley, rice, mustard seed, linseed, sun flower seed, sesame seed, maize, cotton seed, soya beans etc.

The embodiments of the invention in which an exclusive property or privilege is claimed are as follows:

1. A method of dehulling rape seed, comprising the steps of:
   heating the seed to approximately 45°C. to increase grain size;
   applying a cold air current to the rape seed to cool it and also pass it to and through an impact applying step;
   cracking the hulls by causing the cold air current to carry the rape seed to impact the rape seed against a surface so that the rape seed is broken open; and
   separating the seed mechanically from the hulls by friction by causing the cold air current to move the seed past friction applying means;
   all of the steps being performed without oil being extracted from the kernel of the rape seed.

2. The method in accordance with claim 1, wherein:
   the heating step is performed in an interval of 2 to 3 seconds;
   the cold air current is at approximately 10°C. and has a maximum moisture content of 45 percent.

3. The method in accordance with claim 2, wherein the cold air current moves the rape seed through the impact step and the mechanical separation step at a speed of approximately 1,300 to 1,700 meter/min.

4. A method in accordance with claim 1 in which the rape seed is passed through a magnetic field to remove metallic particles, and other foreign particles are also removed from the rape seed prior to said heating.

5. A method in accordance with claim 4 in which after dehulling, the rape seed is classified by falling through an updraft of air.

6. A method in accordance with claim 3, in which the rape seed in the air current is caused to follow a curved circulating path in the impact and mechanical separation steps.

* * * * *